United States Patent [19]

Gallant

[11] Patent Number: 4,901,401
[45] Date of Patent: Feb. 20, 1990

[54] HARVESTING, SHUCKING AND EVISCERATING CLAMS AT SEA

[75] Inventor: William E. Gallant, Scarborough, Me.

[73] Assignee: Borden, Inc., Columbus, Ohio

[21] Appl. No.: 379,361

[22] Filed: Jul. 12, 1989

Related U.S. Application Data

[62] Division of Ser. No. 267,367, Nov. 4, 1988, which is a division of Ser. No. 122,014, Nov. 17, 1987.

[51] Int. Cl.4 .............................................. A22C 29/04
[52] U.S. Cl. ............................................. 17/74; 17/48
[58] Field of Search ....................... 17/74, 48, 46, 53

[56] References Cited

U.S. PATENT DOCUMENTS

| | | | |
|---|---|---|---|
| 3,203,034 | 8/1965 | Matzer et al. | 17/74 |
| 3,528,124 | 9/1970 | Wenstrom et al. | 17/48 |
| 3,594,859 | 7/1971 | Hanks et al. | 17/48 |
| 3,619,855 | 11/1971 | Willis | 17/74 |
| 4,198,728 | 4/1980 | Cohen | 17/48 |
| 4,236,276 | 12/1980 | Van Twuyver et al. | 17/74 |
| 4,255,834 | 3/1981 | Lambert | 17/48 |
| 4,309,793 | 1/1982 | Martin | 17/46 |
| 4,312,099 | 1/1982 | Cohen | 17/48 |
| 4,330,904 | 5/1982 | Lambert | 17/74 |
| 4,532,677 | 8/1985 | Wenstrom et al. | 17/74 |

Primary Examiner—Willis Little
Attorney, Agent, or Firm—Sidney W. Millard

[57] ABSTRACT

A sea-going vessel has mounted on its deck a clam processing plant which includes in sequence a steamer, a clam crusher, a seawater washer, a brine separator, an eviscerator and a chill tank. Special valves are constructed to feed and discharge clams from the steamer which prevents the hot high pressure steam in the steamer from being discharged when the valves are open to the steamer interior. The chill tank includes a special construction to minimize the effects of pitch and roll of the deck while the ship is at sea.

6 Claims, 3 Drawing Sheets

HARVESTING, SHUCKING AND EVISCERATING CLAMS AT SEA

REFERENCE TO RELATED CASE

This a division of application Ser. No. 267,367, filed Nov. 4, 1988, which is a division of application Ser. No. 122,014, filed Nov. 17, 1987, now pending.

FIELD OF THE INVENTION

This invention relates to the harvesting, shucking and eviscerating of clams at sea. It relates particularly to the dredging of ocean Quahog clams from the ocean floor and processing them on board a boat or other sea-going vessel to remove all waste material. All such waste material is then disposed of at sea so that the only product transported from the ocean to the shore is the clean meat of the clam. The invention is not limited to Quahog clams; it is also applicable to the processing of other bivalvular mollusk.

BACKGROUND AND PRIOR ART

Initially, surf clams were harvested for use in chowders and chopped meats. These became very popular and the use of surf clams exceeded the sustainable yield of the beds. Interest then leaned toward ocean Quahogs. Quahog clams grow in deeper water, beyond the surf clam beds. Demands on the Quahog over the years has made it necessary for boats to steam farther and farther from port in order to harvest sufficient amounts of these clams. On reaching port the clams must be unloaded and hauled to a land-based plant for the shucking and eviscerating process which is time-consuming and expensive. Thus, a long period occurs between the dredging of the clams and the processing thereof with the result that the clams are not as fresh as they would be if processed immediately after harvesting.

Land-based shucking has posed several enviromental problems. One is the disposal of solid waste materials, shells, viscera and sand. The ability to dispose of such material is limited since it must be hauled to landfill areas which is costly. These disposal costs will increase in the future because the number of landfill areas are decreasing.

The liquid waste from the land-based process is conventionally disposed of via ocean outfall. The hauling of solid waste to landfills and transporting the liquid waste to a dumping point in the ocean are very expensive procedures. Furthermore, this land-based process is faced with the obtaining of very stringent permits which will be more difficult in the future.

The availability of municipal water is also a major concern. Water procurement is strictly regulated in most locations. Additional water is not available from most municipal water systems. Land-based production expansion is therefore limited. Because of the excessive amounts of water required and the waste disposal facilities necessary, the land-based processing equipment must necessarily be complicated and expensive.

SUMMARY OF THE INVENTION

This invention relates to the harvesting, shucking, and eviscerating of clams at sea where there is an adequate supply of water for processing and the solid waste and liquid waste can be disposed of without undue enviromental problems. All of the clam processing equipment of this invention is mounted on a suitable vessel so that the clams can be dredged at sea and immediately processed on the vessel to first remove the whole clams from the shells and then to treat them in several steps to an eviscerating process to produce the clean meat of the clams so that it is the only product that need be transported to the shore. The clams, usually Quahog clams, are dredged from the sea bed and immediately processed on the boat or vessel by a process using the unlimited supply of sea water. As indicated, the shells and other waste material resulting from this process can be discarded overboard without concern for enviromental standards imposed by the states and federal government. The shells merely settle to the sea floor. Other discarded solid materials are consumed by fowl or fish and any liquid waste is dissolved by the salt water.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
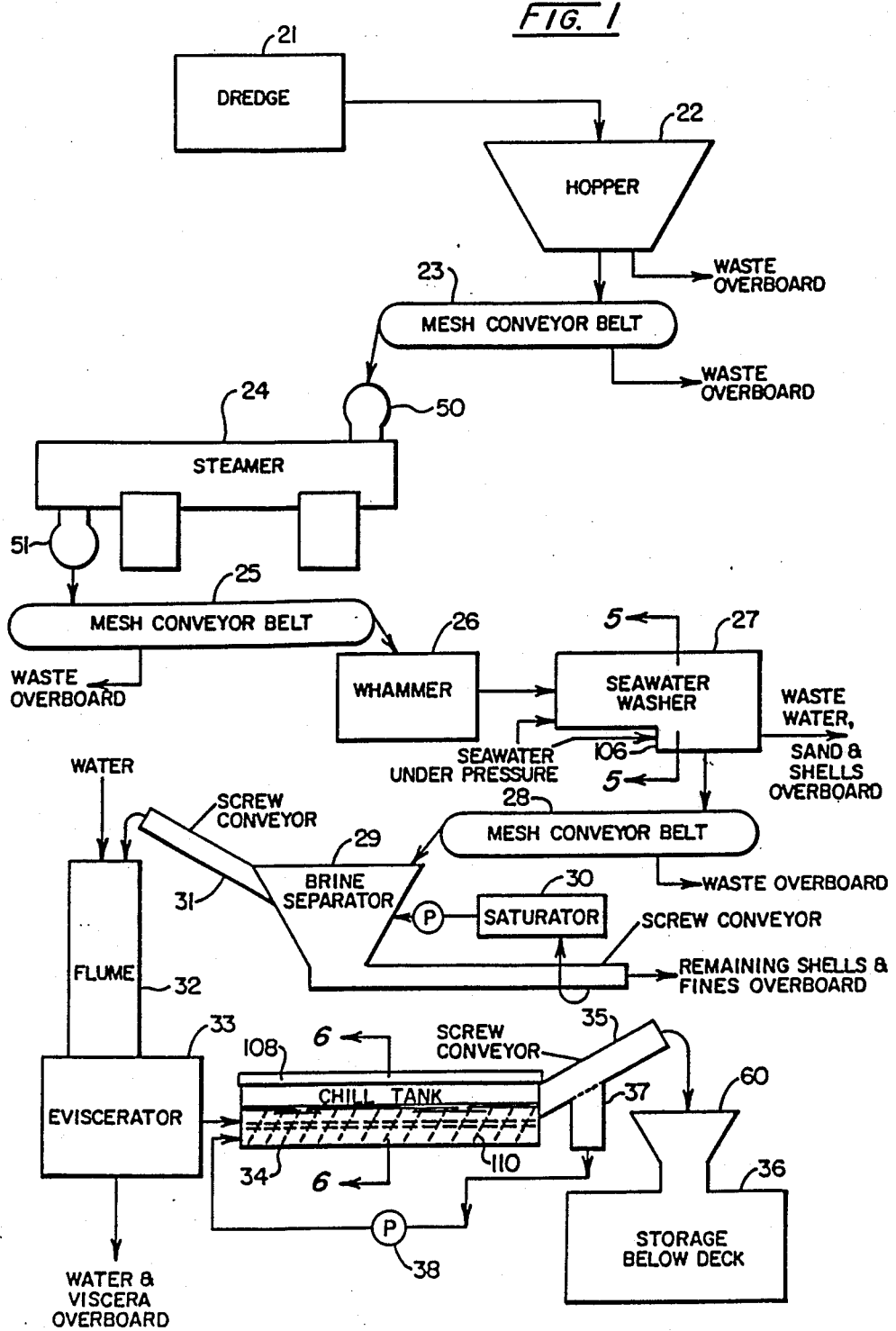
FIG. 1 is a flow diagram indicating the successive steps in the harvesting and treatment of the clams by a continuous process performed by equipment mounted on a vessel at sea.

With reference to FIG. 1 a flow diagram illustrates the successive steps of the process. The clams, usually ocean Quahog clams, are dredged from the sea bed by a suitable dredge indicated at 21 which will be mounted preferably at the stern of a suitable sea-going vessel or boat. The clams are deposited by the dredge into a suitable hopper 22 on the deck of the boat. The hopper feeds the clams onto mesh conveyor belt 23 which permits draining of water overboard. Belt 23 transports them to a continuous high pressure steamer 24 on the boat deck which causes the shells to open and the muscle tissue to release its hold on the shells.

A mesh conveyor belt 25, which allows drainage of liquid to the sea, takes the opened shells to a crusher 26 where the opened shells are crushed to allow separation of the meat from the shells. The crusher drops the clams into a seawater washer 27 which receives the opened clams and by the use of high-pressure sea water jets tumbles, agitates and moves the shells and meat in a turbulent manner to separate the pieces of shells from the meat. The waste water, sand and shell particles are conveyed overboard from the washer 27.

The pumping of water from the ocean is not illustrated but it is intended that a single pumping system be used and branches of piping to pieces of equipment (such as the seawater washer 27) are controlled by valves as necessary.

The separated clam meat is first conveyed by a conveyor 28 preferably to a brine separator 29 into which it drops. The brine separator is a tank in which seawater is supplied supplemented with added salt from a saturator 30 so as to maintain a seventy-five to a hundred percent solution of brine. The separator separates the clam meat from any remaining shells and fines. The shells will settle and the clam meat will float.

FIG. 1 illustrates that the remaining shells and fines are discharged overboard while water is recirculated through the saturator 30. Some fresh seawater may be added to the saturator as needed.

The clam meat from the brine separator is conducted by a screw conveyor 31 to a flume 32 which receives sea water. From the flume the clam meat which still bears the viscera is conducted to an eviscerator 33 which will separate the meat from the viscera. Any conventional eviscerator is satisfactory. The viscera and waste water from the eviscerator are conducted overboard and the clam meat is delivered to a chill tank 34 which is maintained at a temperature of about thirty to thirty-two degrees Fahrenheit. The clam meat is conducted from the tank 34 by a screw conveyor 35 which deposits it in the inlet of a storage tank 36 which may be below the deck of the vessel. In fact the storage tank 36 is a plurality of units holding about thirty-five cubic feet of clams. Water drops by gravity from conveyor 35 into a collection tank 37 and is recirculated by appropriate piping and pumping 38 to the upstream end of the chill tank 34.

Figure 2:
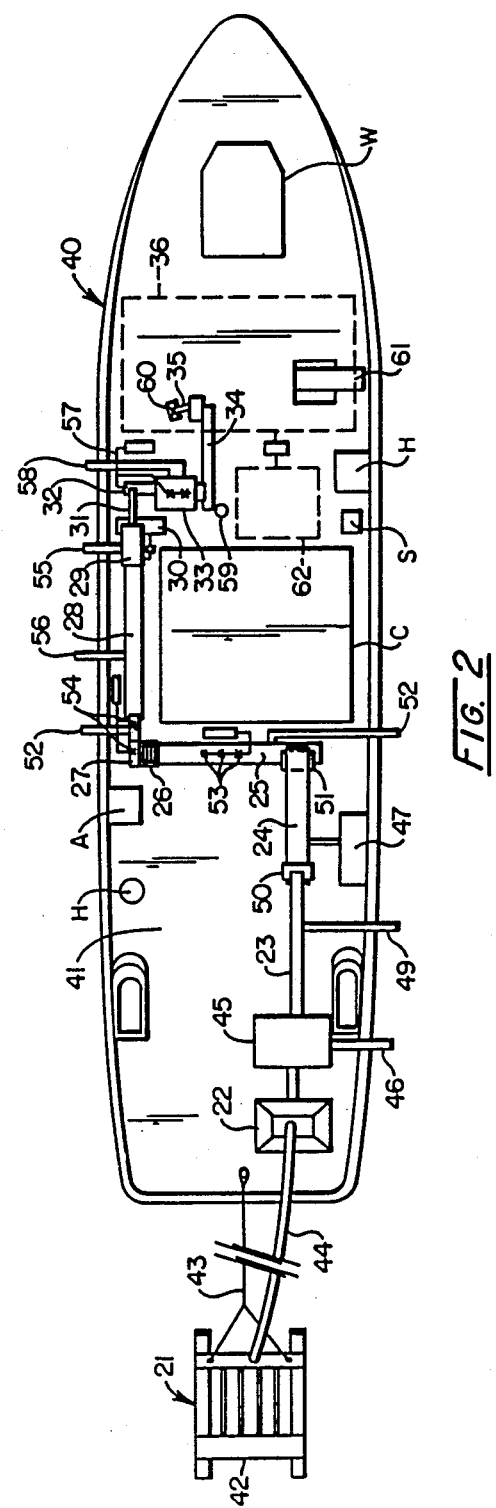
FIG. 2 is a plan view showing the lay-out of the clam processing equipment on the vessel.

The clam processing equipment indicated in FIG. 1 is mounted on a vessel or boat indicated generally by the numeral 40 in FIG. 2. This vessel may be of any suitable type which provides adequate room on the main deck 41 to receive all the processing equipment and storage for the clam meat, resulting from the processing, preferably below deck. The layout of the equipment on deck is arranged as not to interfere with the various units and equipment on deck such as the stacks S, hatches H, air vents A, area C with a cabin and other amidship obstructions (such as a housing to cover the processing equipment), and wheel house W towards the bow. However, the clam processing equipment may be placed on vessels of other types which have different deck arrangements or configurations. The vessel must be capable of going to sea and have a power plant capable of generating enough power to provide any needed electrical and hydraulic needs to operate the various units and pumps for supplying the large amounts of sea water used in the treatment. It must also have a boiler for supplying the required steam plus storage and refrigeration equipment below deck.

The dredge 21 is of any suitable type and may include a drag unit 42 which is dragged along the ocean floor to harvest the clams as it is pulled along by a line 43 at the stern of the boat. A tube 44 supplies high pressure jets of water to assist the separation of sand and ocean floor solids from the shell fish. Periodically the dredge is raised to the surface and it carries the collected mollusks, shellfish, clams, sponges, scallops, and other foreign material to a hopper 22 mounted on the deck of the boat at its stern. Here the clams are collected and discharged to a separator 45 where the clams are separated from the other undesirable foreign materials and the waste material and waste water are directed overboard through a conduit 46. The inspection conveyor belt 23 which receives the clams from the separator includes an underlying pan (not shown) for receiving the water which is in turn connected to a conduit 49 to drain water overboard. The conveyor 23 transfers the shells to the inlet pocket or valve 50 of the continuous-high pressure steamer 24 which receives steam at a pressure of 30 to 60 psi from a source 47 and is supported in horizontal position on the boat deck. This steamer causes the shells of the clams to open and the muscle tissue to release their hold on the shells. The steamer 24 has a discharge pocket 51 at its lower end for receiving the opened shells. This discharge pocket 51 discharges the opened shells onto the inspection mesh conveyor belt 25 which also has an underlying pan for receiving waste water that is drained to the sea through a connected conduit 52. Above this conveyor may be provided seawater sprays 53 to remove sand and other material adhering to the shells.

Figure 3:
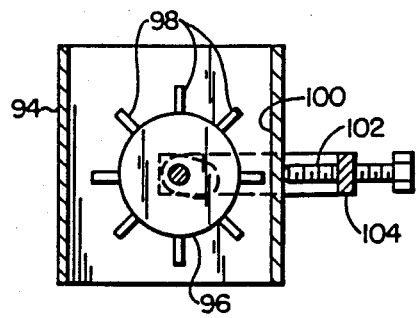
FIG. 3 is a fragmentary sectional elevational view of the whammer, partially in section.

The conveyor belt 25 conveys the opened claims to the clam crusher 26 (FIG. 3) which is known in the art as a "whammer". This crusher crushes the shells of the opened clams to allow separation of the meat.

The crusher 26 drops the crushed clams into a two compartment seawater washer 27 (FIG. 5) which consists of two connected compartments which receive the opened clams and by means of high-pressure seawater jets 54 move the shells and meat in a turbulent manner through the compartments to separate the pieces of shells from the clam meat. The second compartment is at a lower level so that the clams with their opened shells drop a substantial distance to give additional impact to the shell particles which may still be clinging to the clam meat so as to separate them therefrom. Note the curved bottom and three water jets 54 at each level of washer 27 in FIG. 5 which prevent inadvertent collection of shells along the sides or bottom as would a washer with corners or a flat bottom.

The waste water from the washer 27 along with the sand and shell particles will be directed overboard by a conduit 55. The clam meat will float in the washer and will be directed onto the inspection mesh conveyor belt 28 which will have a pan beneath it that is connected to a conduit 56 to drain waste water overboard. The conveyor 28 conducts the clam meat to the brine separator 29 which is supplied with sea water intermittently. The clam meat drops into the brine and the remaining shells and fines will settle to the bottom of the separator and be directed overboard through a conduit 57. The clam meat will float and be conducted from the separator 29 by a screw conveyor 31.

The seawater in the brine separator is supplemented with more salt from saturator 30. Sufficient salt is supplied therefrom to maintain the salinity at a seventy-five to one-hundred percent solution. The added salt has two purposes. One is that it increases the specific gravity of the water to better separate the clam meat from any remaining shells and fines and the other is that the salt itself deters microbial growth.

Figure 5:
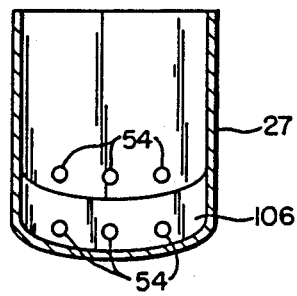
FIG. 5 is a sectional view of the seawater washer taken along line 5—5 of FIG. 1.

The screw conveyor 31 drops the clam meat into a flume 32 which receives sea water from a suitable source and which may have water jets (not shown) to move the meat, for example, the jets could be arranged as shown in one section of the seawater washer of FIG. 5. The flume 32 feeds the clam meat and water into the eviscerator 33 which may be of any conventional type. This eviscerator separates the viscera from the clam meat.

Figure 6:
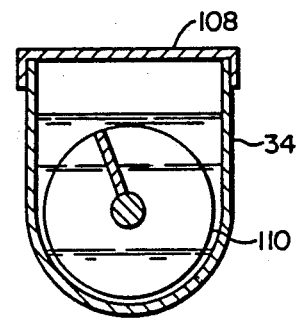
FIG. 6 is a sectional view of the chill tank taken along line 6—6 of FIG. 1.

The waste water and viscera are conducted overboard by a conduit 58. The clam meat is deposited from the lower end of the eviscerator into the chill tank 34 (FIG. 6). This chill tank is covered and is maintained at a temperature of about thirty to thirty-two degrees Fahrenheit by $CO_2$ nozzles 59. The clam meat is moved from the chill tank by screw conveyor 35 which deposits it in the inlet 60 leading to the refrigerated storage tank 36 below deck where it will remain until port is reached, at which time it can be removed by a conveyor 61. Potable water may be supplied into the chill tank from a source 62.

As indicated previously, one of the great advantages of processing the clams at sea is the ease of disposal of waste water and waste materials overboard. Such disposal has been indicated above. Another great advantage is the availability of sea water for processing. The water is taken from the sea by a hydraulic pumping system. It is preferred that a central pump supply water to a manifold and seawater supply to various units be controlled by valves adjacent the manifold.

It will be apparent from the above that the entire processing of the clams occurs at sea where there is an unlimited supply of water for processing and the disposal of waste is no problem. The clams are dredged up by the dredge 21 and while still fresh are processed. They are first steamed in the high pressure steamer 24 which causes the shells to open and the muscle tissue to release its hold on the shells. The opened clams are then subjected to the crusher 26 which crushes them and allows separation of the meat from the shells. The crushed clams are then subjected to the washer 27 which will agitate and move the shells and meat in a turbulent manner to separate the clam meat from the sand, small shell particles and the like. The clam meat is then conveyed to the brine separator 29 which causes the meat to float and shell particles to settle. After leaving the brine separator the clam meat is transported through the eviscerator 33 which separates the meat from the viscera and the meat is then delivered to the chill tank 34. From the chill tank the clam meat is transferred into the tank 36 below deck.

Since all of the waste is disposed of overboard during the processing at sea it is necessary to transport only the separated clam meat to port where it can be removed from the refrigerated tank 36 by a conveyor 61. The processing of the clams occurs while they are still fresh shortly after they are harvested. The tremendous amount of water necessary for the processing is readily available from the sea. After processing, the clam meat is immediately stored in a refrigerated space. Thus, since the clams are processed immediately after harvesting and the resulting clam meat is immediately refrigerated until port is reached it will be fresh when removed from the vessel.

Figure 7:
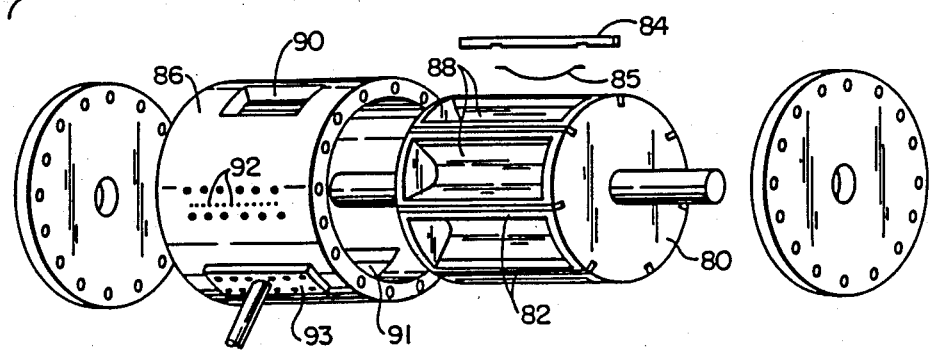
FIG. 7 is an exploded perspective view of the inlet and outlet valves to the steamer.

Looking now to FIG. 7, the inlet and outlet valves 50 and 51 associated with the steamer 24 allow the steamer to operate at higher pressures and consequently the residence time of clams can be reduced. Both valves are structurally and physically equivalent therefore only one will be described. The problem solved was an explosive blowout of high pressure steam from the steamer each time the valve opened to admit clams (or discharge clams at the other end). To solve this problem an eight section rotating valve is illustrated which cools the contents of the sections. A rotary core 80 includes eight radially extending vanes 82. At the outer edge of each vane is a brass seal strip 84 biased outward by spring 85 for sealingly engaging the interior surface of circular casing 86. Thereby eight pockets 88 are provided to receive clams.

At diagonally opposite sides of casing 86 are an inlet 90 to the valve and an outlet 91 to the steamer 24. In operation, one pocket 88 will dump clams through outlet 91 and at the same time the vacated pocket will receive a burst of hot high pressure steam from the steamer interior. Continued rotation of the body 80 moves the pressurized pocket out of fluid communication with outlet 91 and into fluid communication with a cold water spray through openings 92. An inlet manifold 93 feeds water through openings 92 and one manifold is removed in FIG. 7 to better show the openings. The cold water cools and condenses the steam and thereby reduces the pressure. Thus, when the cooled pocket arrives at inlet 90 there is essentially no upward burst of steam to disrupt the gravity descent of clams into the pocket. The reverse physical arrangement is used with valve 51 except that the cooling water is sprayed into the pocket filled with hot clam shells and steam. Obviously it will take a larger volume of water to cool the shells, etc. than the steam alone as in pocket 50 and some adjustment in water volume will be required as between inlet and outlet valves.

Figure 4:
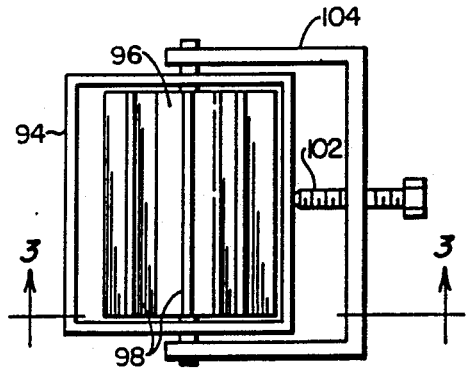
FIG. 4 is a top view of FIG. 3.

FIG. 4 shows the whammer or crusher and it includes a rectangular metal box 94 with a rotating body 96 mounted therein. The body includes a plurality of radically extending fins 98 of very rigid construction. Clams are dumped into box 94 while body 96 rotates and the fins confine the clams in a constantly decreasing cavity. That is, as the fin rotates toward wall 100 the space for the clams will get smaller and the shells will be crushed by the pressure. Adjustment screws 102 (only one screw is illustrated) are threaded through a U-shaped axle mount 104. The ends of screws 102 abut wall 100 and allow the body 96 to move closer to wall 100 should that be desirable due to smaller clam shells, for example. The crusher may be operating at six hundred rpm or so but speeds may need to be adjusted to accommodate different conditions. Infinitely adjustable speeds are achieved by using a hydraulic drive motor (not shown) to rotate body 96.

Looking to FIG. 5 and the seawater washer 27, the three jets 54 in each section tumble and agitate the clams from the crusher 26 to separate the shells from the meat. The drop wall 106 between the two sections of the washer is to provide an impact to the shells still clinging to the meat and promote separation.

In the chill tank 34 the shells, sand, viscera, etc. will have been separated and the clam meat will float on the brine and be drawn off by screw conveyor 35. However, the pitch and roll of a boat may create problems because the sloshing may dump meat and water on the deck. To prevent water on the deck a cover 108 fits over the top of the tank and to prevent premature discharge of the meat due to pitch and roll a screw 110 is provided in the bottom of tank 34 to slow the flow and discharge.

Having thus described the invention in its preferred embodiment it will be clear that modifications may be made to the apparatus without departing from the spirit of the invention. It is not intended that the words and drawings used to describe the preferred embodiment be limited on the invention. Rather it is intended that the invention be limited only by the scope of the appended claims.

Having thus described the invention, what is claimed is:

1. A clam crusher including a rectangular box with a rotatable body mounted therein,
    said box being closed on four sides and open on two
        sides to allow clams to be delivered through one open side, crushed between one closed side and the body, and discharged through the other open side, said body being mounted to rotate about an axis perpendicular to the direction of flow of clams entering said box and parallel with said one closed side, said body including an axle projecting through slots on two closed sides of said box, said two closed sides being generally parallel to each other and perpendicular to said one closed side, said axle including radially extending fins which form compartments to receive clams delivered through said one open side, means for adjusting the spacing between said axle and said one closed side.

2. A clam crusher according to claim 1 wherein the means for adjusting comprises a yoke mounted over the ends of the axle exterior of said box, at least one threaded bolt extending through said yoke and in threaded engagement therewith, one end of said bolt bearing against the exterior surface of said one closed side, said slots being elongated in a direction perpendicular to said one closed side to allow the axle to be adjusted to different spacings with respect to said one closed side response to adjustment of said bolt.

3. The claim crusher of claim 2 wherein the axle is rotated by a hydraulic drive motor.

4. The clam crusher of claim 3 wherein the motor is adjustable to vary the speed of rotation of said axle.

5. The clam crusher of claim 1 wherein the axle is rotated by a hydraulic drive motor.

6. The clam crusher of claim 5 wherein the motor is adjustable to vary the speed of rotation of said axle.

* * * * *